United States Patent
Matsuda et al.

(10) Patent No.: US 7,721,708 B2
(45) Date of Patent: May 25, 2010

(54) CONTROL SYSTEM FOR GENERAL-PURPOSE ENGINE

(75) Inventors: Hayato Matsuda, Saitama (JP); Tomoki Fukushima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 12/069,819

(22) Filed: Feb. 13, 2008

(65) Prior Publication Data

US 2008/0202474 A1    Aug. 28, 2008

(30) Foreign Application Priority Data

Feb. 22, 2007    (JP) ............................. 2007-041692

(51) Int. Cl.
*F02D 9/08* (2006.01)
*F02D 31/00* (2006.01)
*F02D 41/00* (2006.01)
*F02M 7/00* (2006.01)

(52) U.S. Cl. .................... 123/403; 123/436; 123/361; 123/357

(58) Field of Classification Search ................. 123/436, 123/673, 403, 198 F, 54.1, 54.4, 336, 361, 123/352, 357
See application file for complete search history.

(56) References Cited

U.S. PATENT DOCUMENTS

2002/0121266 A1* 9/2002 Nogi et al. ................ 123/361
2003/0056753 A1* 3/2003 Fukushima et al. ......... 123/335
2003/0186781 A1* 10/2003 Landes et al. .............. 477/111

FOREIGN PATENT DOCUMENTS

JP    2002-349384    12/2002

* cited by examiner

*Primary Examiner*—Stephen K Cronin
*Assistant Examiner*—Raza Najmuddin
(74) *Attorney, Agent, or Firm*—Carrier, Blackman & Associates, P.C.; William D. Blackman; Joseph P. Carrier

(57) ABSTRACT

In a system for controlling a general-purpose air-cooled internal combustion engine having two cylinders each equipped with a throttle valve and a fuel injector, and a cooling fan that selectively directs air onto the cylinders, a throttle driver selectively drives the respective throttle valve of each cylinder to open or close. The system also includes an injector driver that selectively drives the respective injector of each cylinder to open, and a controller that controls operation of the throttle driver and injector driver in such a way that the throttle opening and an amount of fuel to be injected are different for each cylinder, such that an engine speed becomes substantially constant, thereby enabling the engine to obtain desired output characteristics.

8 Claims, 7 Drawing Sheets

CONTROL SYSTEM FOR GENERAL-PURPOSE ENGINE

CROSS REFERENCE TO RELATED APPLICATIONS

The present application claims priority under 35 USC 119 based on Japanese Patent Application JP2007-041692 filed on Feb. 22, 2007, the entire contents of which are incorporated herein by reference.

BACKGROUND OF THE INVENTION

1. Field of the Invention

This invention relates to a control system for controlling a general-purpose internal combustion engine, particularly to a control system for a general-purpose internal combustion engine of forced-air-cooled type that sucks in air through a cooling fan and selectively directs the air for cooling the engine.

2. Description of the Related Art

Among general-purpose engines used as prime movers in electric generators, agricultural machines and various other applications, in recent years, there is proposed a general-purpose engine equipped with a plurality of cylinders such as, e.g., two cylinders, each having a throttle valve for opening and closing air an intake path, and an injector for injecting fuel for the cylinder, as taught, for example, in Japanese Laid-Open Patent Application No. 2002-349384.

General-purpose engines, including the engine disclosed in the prior art mentioned above, are generally air-cooled. However, engines which produce a large amount of output, are often configured to forcibly air-cool by blowing or emitting air sucked in through a fan for cooling. Since the structure of this type of engines results in differences of cooling effect among the cylinders, they are disadvantageously difficult to control in a manner so as to perform desired output characteristics.

SUMMARY OF THE INVENTION

An object of this invention is therefore to overcome the foregoing problems by providing a system for controlling a general-purpose internal combustion engine configured to forcibly air-cool by selectively routing air which has been sucked in through a fan for cooling, in order to achieve desired output characteristics.

In order to achieve the above object, this invention provides a system for controlling a general-purpose internal combustion engine having a plurality of cylinders each equipped with a throttle valve that opens or closes an air intake path, and a fuel injector that injects fuel into a combustion chamber, and a cooling fan that selectively routes air onto the cylinders as cooling air, comprising: a throttle driver that drives an actuator of the throttle valve of each of the cylinders to open or close; an injector driver that drives the fuel injector of each of the cylinders to open; and a controller that controls operation of the throttle driver and injector driver in such a way that the throttle opening and an amount of fuel to be injected are different for each of the cylinders, such that an engine speed becomes substantially constant.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A control system for a general-purpose engine according to a preferred embodiment of the present invention will now be explained with reference to the attached drawings.

Figure 1:
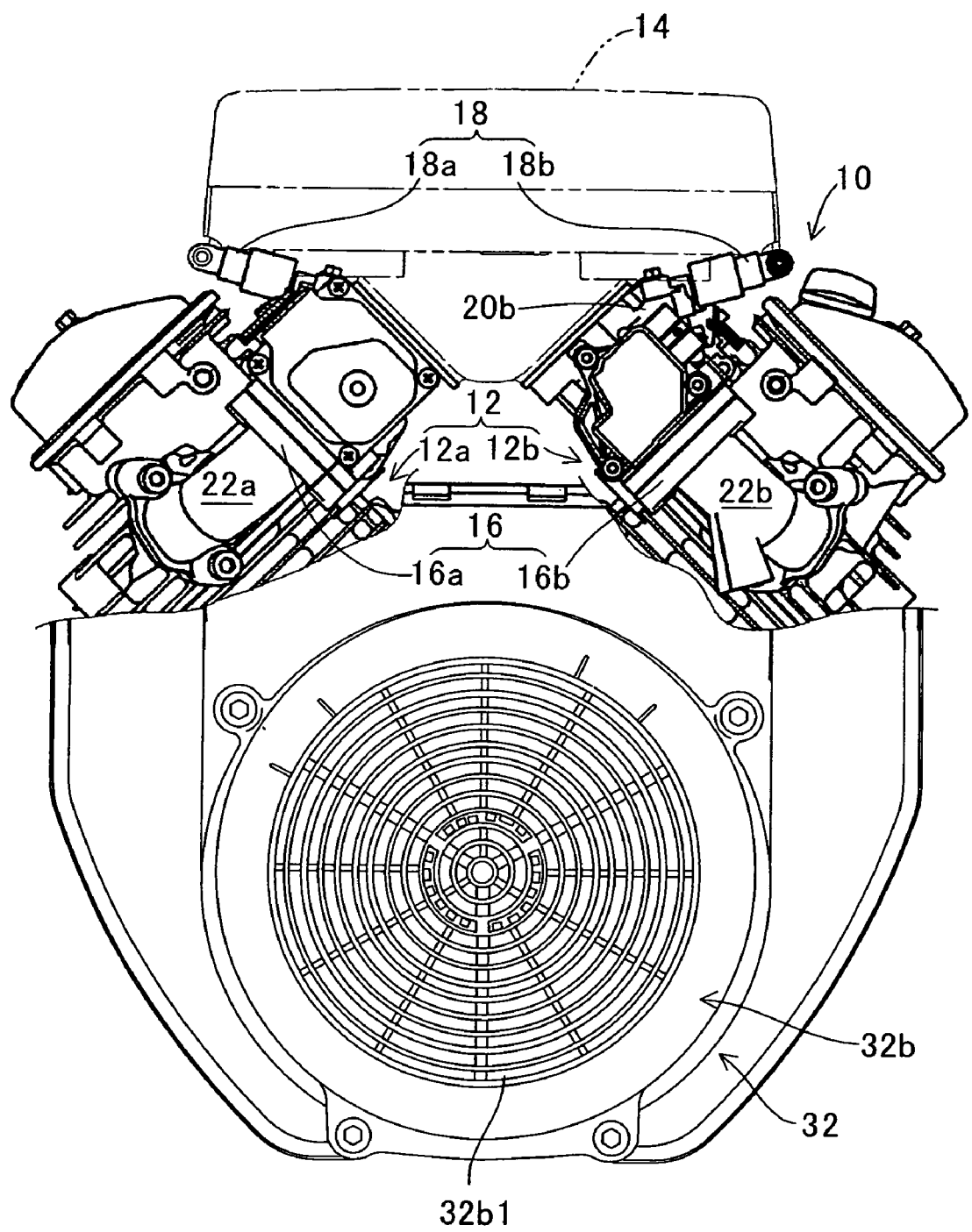
FIG. 1 is a front view of a general-purpose engine to which a general-purpose engine control system according to an embodiment of this invention is applied.
Figure 2:
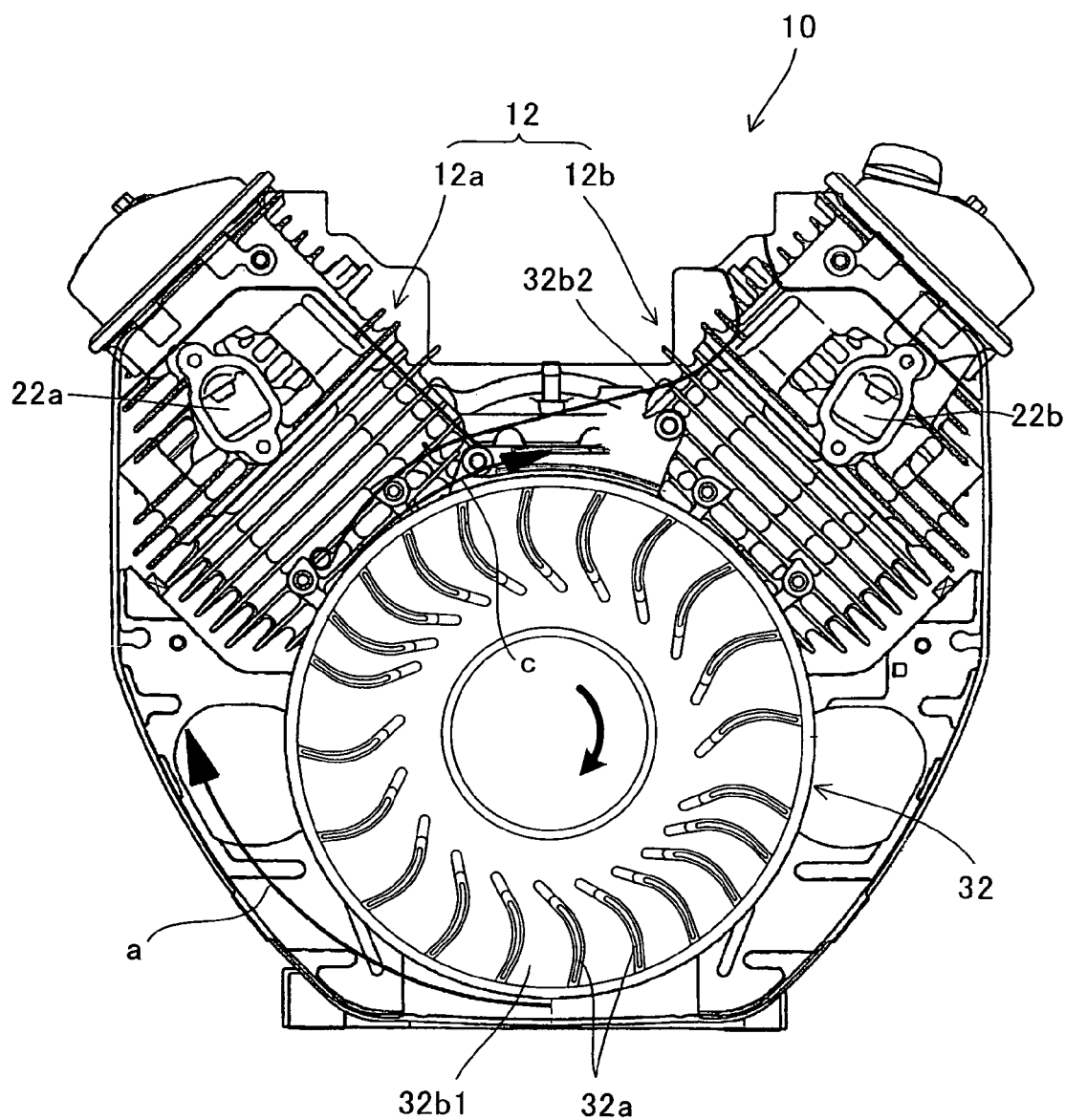
FIG. 2 is a view, similar to FIG. 1, but a cooling fan is removed.
Figure 3:
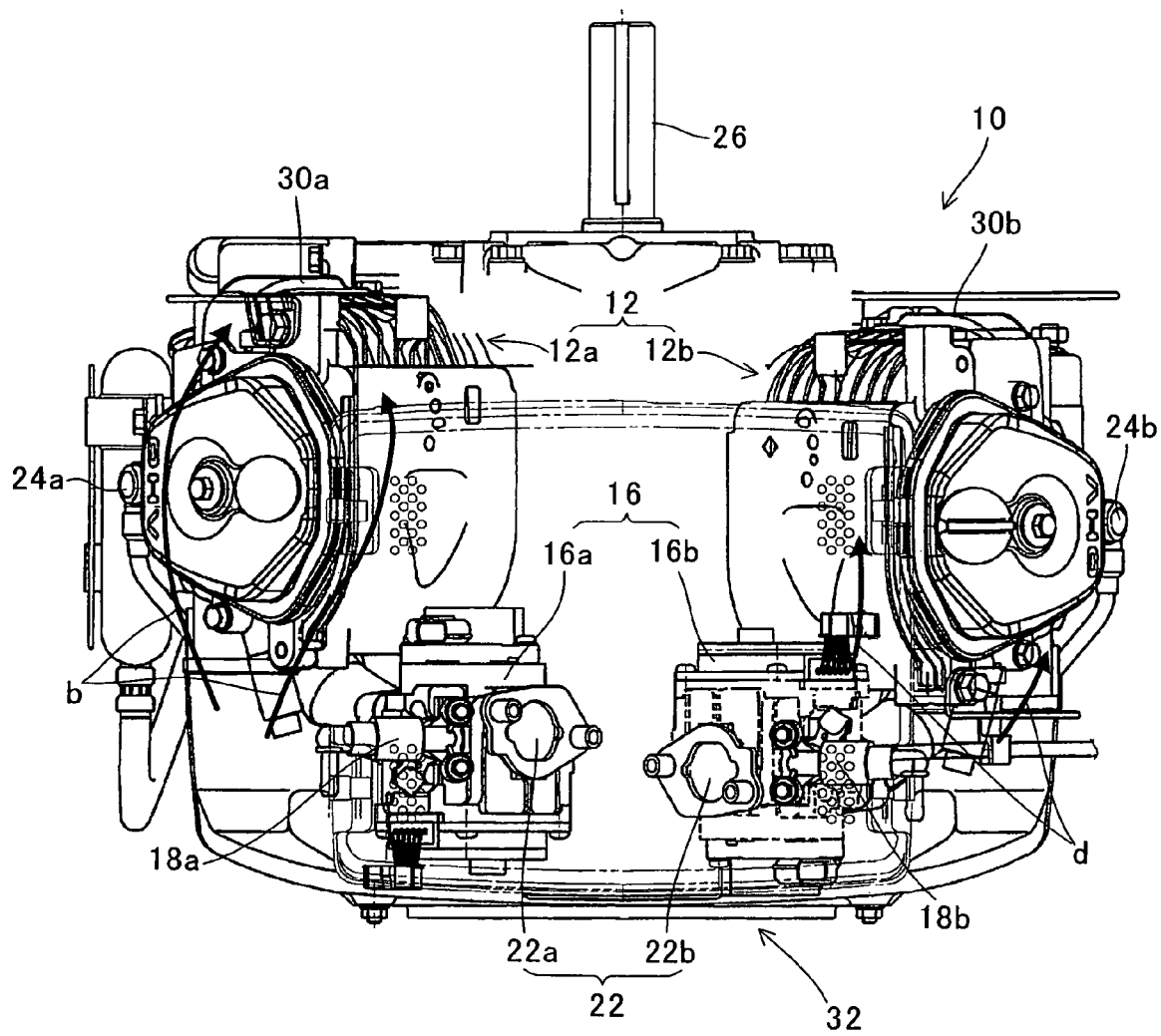
FIG. 3 is a top view of the engine shown in FIG. 2.

FIG. 1 is a front view of a general-purpose engine to which a general-purpose engine control system according to an embodiment of this invention is applied, FIG. 2 is a view, similar to FIG. 1, but a cooling fan is removed and FIG. 3 is a top view of the engine shown in FIG. 2.

In FIG. 1 and other figures, reference numeral 10 designates a general-purpose internal combustion engine. The engine 10 is an air-cooled, four-cycle, V2, spark-ignition, gasoline engine equipped with a plurality of cylinders, i.e., two cylinders 12 comprising a first cylinder 12a and second cylinder 12b arranged in a V-shape with respect to a crankshaft (not shown). The engine 10 has a displacement of, for example, 640 cc and can be used as a prime mover in electric generators, agricultural machinery and various other applications.

In each respective cylinder of the first cylinder 12a and the second cylinder 12b of the engine 10, air sucked in through an air cleaner 14 (only shown in FIG. 1) flows through an air intake pipe (air intake path; not shown). Having regulated its flow rate at a first throttle valve or a second throttle valve (neither shown) housed in a first throttle body 16a or a second throttle body 16b, the air is injected with pressurized gasoline fuel (supplied from a fuel tank) by a first fuel injector 18a or a second fuel injector 18b, when the injectors 18a, 18b are driven to open. The air-fuel mixture thus produced flows through a first intake manifold 22a or a second intake manifold 22b into a combustion chamber.

The first and second throttle valves are respectively connected to associated electric motors (neither shown) and driven thereby to be opened and closed. In FIG. 1, a motor drive circuit of the first throttle body 16a is not shown, but that of the second throttle body 16b is designated by reference numeral 20b. As described in the foregoing, elements constituting or belonging to the first cylinder 12a are added with a term "first" and suffixed by "a", and those constituting or belonging to the second cylinder 12b with a term "second" and by "b."

The air-fuel mixture produced in the combustion chamber is ignited by a first spark plug 24a or a second spark plug 24b. The resulting explosive combustion drives each piston (neither shown) to rotate a crankshaft (not shown) connected thereto, thereby rotating an output shaft 26 connected to the crankshaft. The exhaust gas produced by the combustion passes through a first exhaust port 30a or a second exhaust 30b, joins together and passes through an exhaust pipe (not shown) to be discharged to the exterior. The output shaft 26 is connected to a load such as an electric generator, agricultural machine or the like.

The other end of the crankshaft (opposite from the one end where the output shaft 26 is connected) is coupled with a cooling fan 32. As shown in FIG. 2, the cooling fan 32 comprises a plurality of projecting blades 32a. When rotated by the crankshaft, the cooling fan 32 sucks in ambient air, and blows the air onto the first and second cylinders 12a, 12b for cooling. Thus, the engine 10 is the type of air-cooled engine which operates using forced-air-cooling. The cooling fan 32 is covered by a fan cover 32b.

Figure 4:
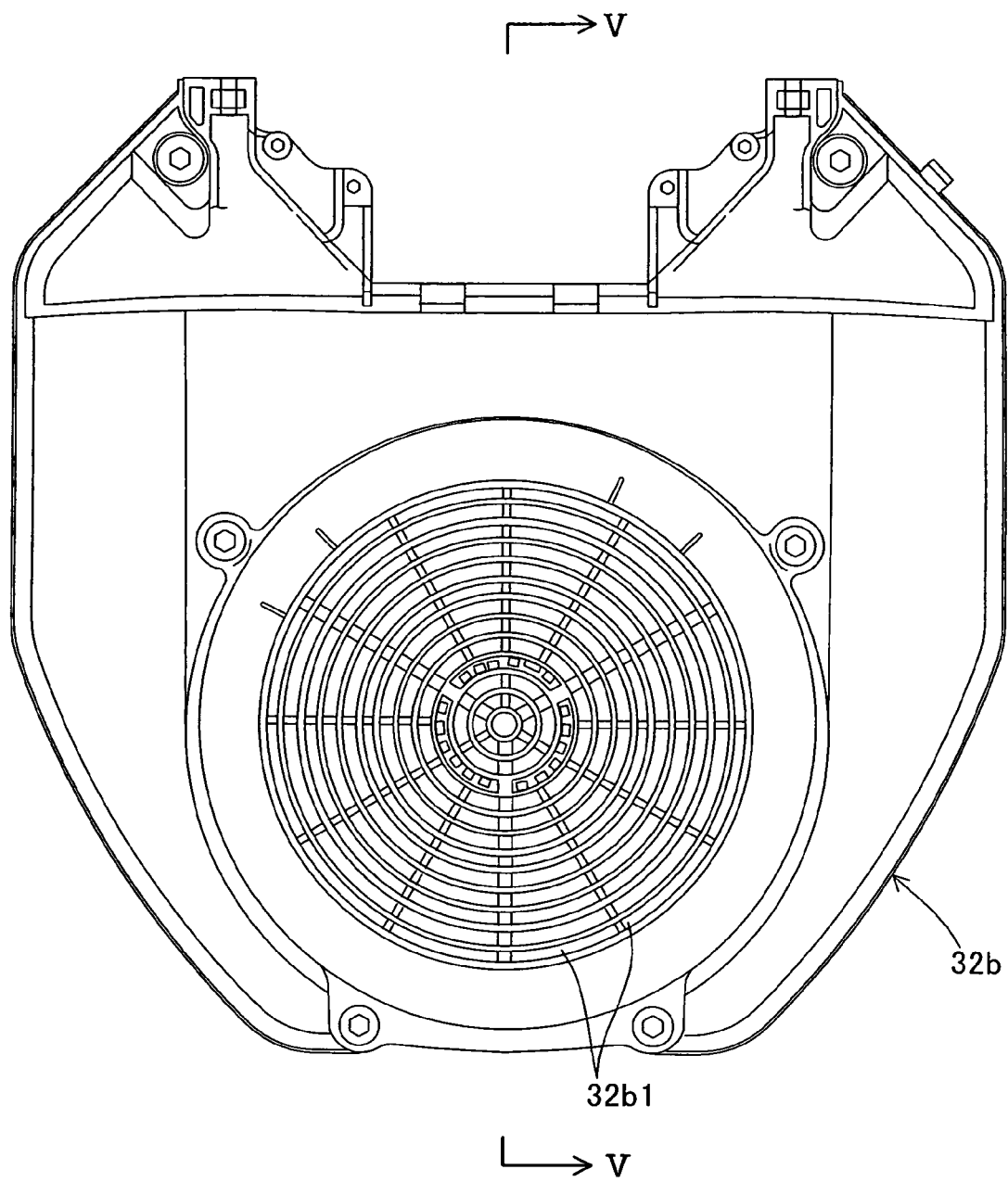
FIG. 4 is a front view of the fan cover shown in FIG. 1.
Figure 5:
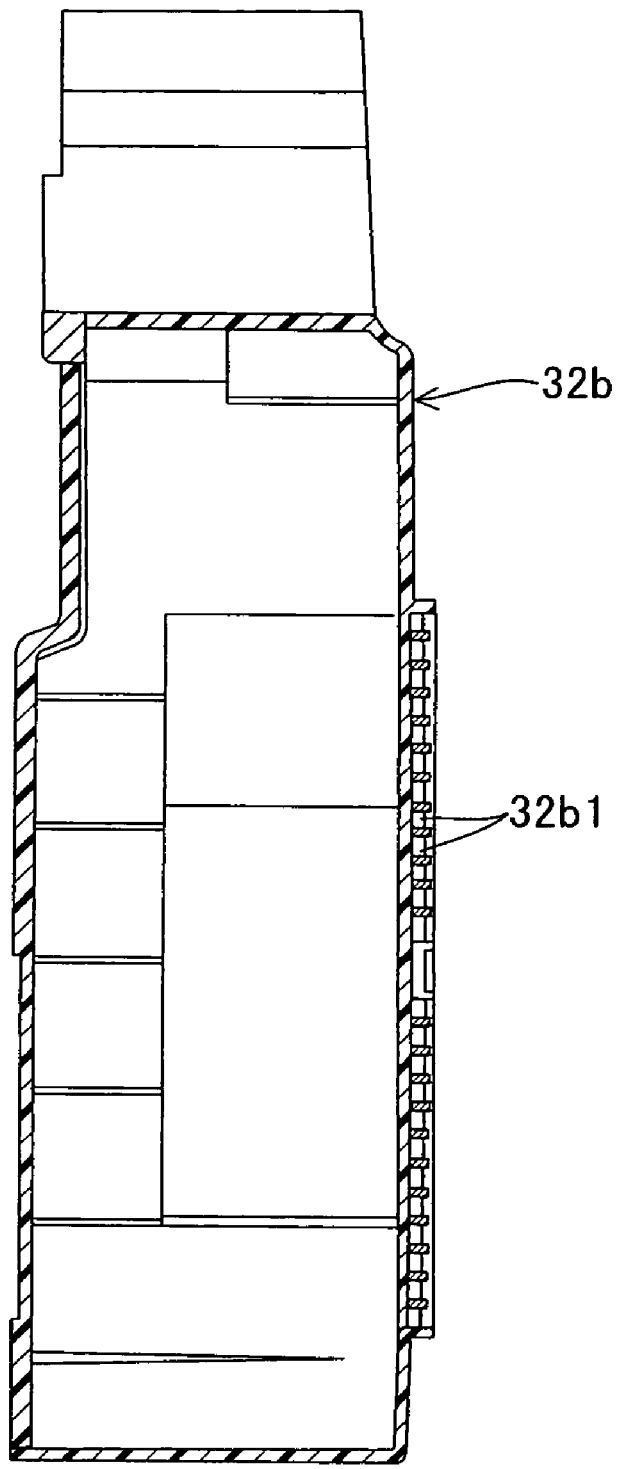
FIG. 5 is a cross-sectional view taken along line V-V of the fan cover shown in FIG. 4.

FIG. 4 is a front view of the fan cover 32b and FIG. 5 is a cross-sectional view taken along line V-V thereof. Most part of the fan cover 32b forms multiple air inlets 32b1 by dividing a circular shape as shown in FIG. 4 (and FIG. 1) and as shown in FIG. 2, a scroll or partition baffle 32b2 is formed at the upper portion of the inner side of the air inlets 32b1. The partition baffle 32b2 constitutes a path for guiding cooling air to the second cylinder 12b.

As shown in FIG. 2, when the crankshaft of the engine 10 rotates clockwise, air sucked in through the air inlets 32b1 flows to the first cylinder 12a as indicated by an arrow a in the figure, flows to cool the first cylinder 12a as indicated by an arrow b (FIG. 3), and then is discharged to the exterior of the engine 10 through gaps between the air cleaner 14 and engine body.

On the other hand, a part of the cooling air indicated by the arrow a flows to the second cylinder 12b along the scroll 32b2 as indicated by an arrow c in FIG. 2, flows to cool the second cylinder 12b as indicated by an arrow d in FIG. 3, and then is discharged to the exterior of the engine 10 through the gaps between the air cleaner 14 and engine body. In this case, since the second cylinder 12b is located downstream in the cooling air flow, cooling effect at the second cylinder 12b is inferior to the cooling effect received by the first cylinder 12a.

Next, a control system of the engine 10 will be explained.

The crankshaft is attached with a flywheel (not shown) at the back of the cooling fan 32. Inside of the flywheel is disposed a power coil (generator coil; not shown) and outside of the flywheel is disposed a pulsar coil (not shown). The power coil and pulsar coil produce outputs (alternating current) synchronously with rotation of the crankshaft.

An engine speed regulating lever (not shown) is equipped on the engine 10 at a location for the operator to freely manipulate. The lever produces an output or signal indicative of an engine speed desired by the operator. The outputs of the power coil, pulsar coil and engine speed regulating lever are sent to an Electronic Control Unit (ECU) comprising a microcomputer.

Figure 6:
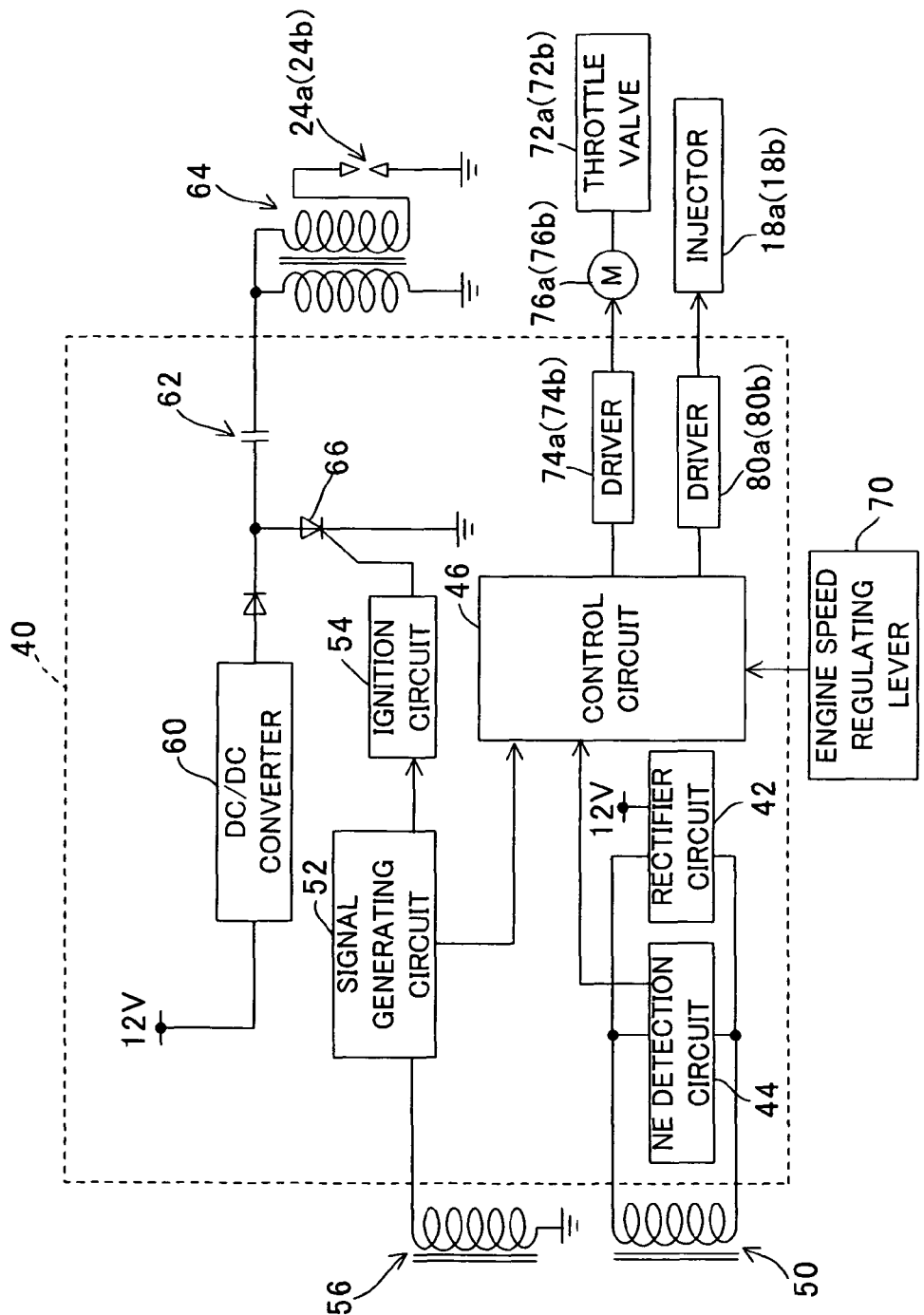
FIG. 6 is a block diagram functionally showing the structure of a control system of the engine including an ECU and a control circuit and shown in FIG. 1 and other figures.

FIG. 6 is a block diagram functionally showing the structure of the control system of the engine 10 including the ECU and a control circuit.

As illustrated, the ECU (40) is equipped with a rectifier circuit 42, engine speed (NE) detection circuit 44 and control circuit (controller) 46. The output of the power coil (50) is sent to the rectifier circuit 42 to be converted into direct current of 12V through full-wave rectification or the like. The direct current is supplied as operating current to components including the ECU 40 of the engine 10 via circuits (not shown).

The output of the power coil 50 is also sent to the engine speed detection circuit 44 to be converted into a pulse signal through half-wave rectification. The produced pulse signal is inputted to the control circuit 46. Since frequency of the alternating current generated by the power coil 50 is proportional to rotation speed of the crankshaft, the control circuit 46 detects the engine speed NE based on the pulse signal generated from the output of the power coil 50.

The ECU 40 is further equipped with a signal generating circuit 52 and ignition circuit 54. The output of the pulsar coil (56) is sent to the signal generating circuit 52 which generates an ignition signal in synchronism with rotation of the crankshaft. The ignition signal generated in the signal generating circuit 52 is sent to the ignition circuit 54 and control circuit 46.

The operating current is boosted at a DC/DC converter 60 and charges a capacitor 62. The capacitor 62 is connected to a primary coil of the ignition coil 64 and a secondary coil thereof is connected to the first and second ignition plugs 24a, 24b of the first and second cylinders 12a, 12b. The control circuit 46 is supplied with operating current via a circuit (not shown).

The ignition circuit 54 energizes the gate of a thyristor 66 in response to the ignition signal inputted from the signal generating circuit 52 or control circuit 46. As a result, the capacitor 62 discharges the current that flows from the primary coil of the ignition coil 64 and high voltage is generated at the secondary coil, and accordingly the ignition plugs 24a, 24b produce sparks.

The control circuit 46 is connected to the engine speed regulating lever (70). Based on the output of the engine speed regulating lever 70 etc., the control circuit 46 determines desired openings of the first and second throttle valves (assigned with 72a, 72b in FIG. 6), outputs control signals corresponding to the determined throttle openings to the first and second (throttle) drivers 74a, 74b (same as the driver 20b in FIG. 1) to operate the first and second electric throttle motors (assigned with 76a, 76b in FIG. 6), thereby separately opening and closing the first and second throttle valves 72a, 72b to regulate the engine speed NE.

The control circuit 46 also calculates a fuel injection amount to be supplied to each of the first and second cylinders 12a, 12b based on the determined throttle openings and drives the first and second injectors 18a, 18b separately through first and second (injector) drivers 80a, 80b.

Specifically, the fuel injection amount to be supplied to the cylinder 12 is determined in terms of opening period of the injector 18, and the control circuit 46 controls the fuel injection amount by regulating the injector opening period through the driver 80. The control circuit 46 of the ECU 40 corresponds to the control system of the engine 10.

Figure 7:
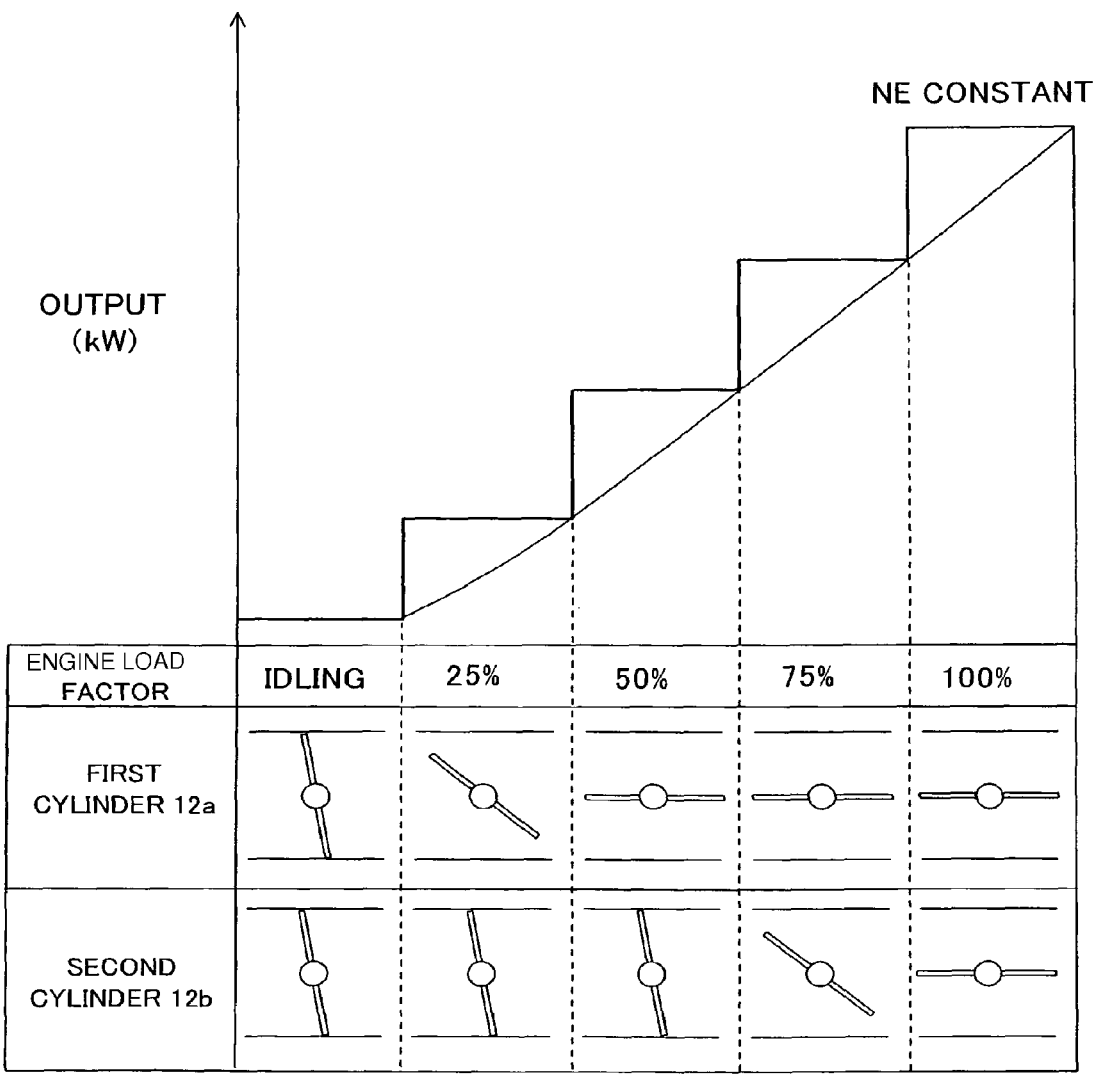
FIG. 7 is an explanatory view showing characteristics of throttle control performed by the control circuit shown in FIG. 6.

FIG. 7 is an explanatory view showing characteristics of throttle opening control performed by the control circuit 46.

As illustrated, the control circuit 46 controls the throttle openings in response to engine load factor, i.e., a rate of load of the engine 10 imparted through the output shaft 26 (the load connected to the output shaft 26 of the engine 10), such that the engine speed NE becomes substantially constant (controlled to the desired value), while controlling the throttle openings of the cylinders 12, i.e., the first and second cylinders 12a, 12b to be different from each other.

Specifically, when the engine load factor is 25 percent, the control circuit 46 controls the throttle opening of the first cylinder 12a to be 50 percent and that of the second cylinder 12b to be 0 percent, such that the throttle opening of the engine 10, as a whole, is 25 percent.

When the engine load factor is 50 percent, the control circuit 46 controls the throttle opening of the first cylinder 12a to be 100 percent and that of the second cylinder 12b to be 0 percent, such that the throttle opening of the engine 10, as a whole, is 50 percent. When the engine load factor is 75 percent, it controls the throttle opening of the first cylinder 12a to be 100 percent and that of the second cylinder 12b to be 50 percent, such that the throttle opening of the engine 10, as a whole, is 75 percent.

The control circuit 46 controls the throttle opening of the first cylinder 12a positioned upstream in the flow of the cooling air to be increased greater than that of the second cylinder 12b positioned downstream, in other words, controls the throttle opening of the second cylinder 12b to decrease greater than that of the first cylinder 12a positioned upstream. This is because, in the engine 10, the second cylinder 12b (positioned downstream of the first cylinder in the cooling air flow) is inferior to the first cylinder 12a in the cooling effect due to its location, i.e., is less likely to be cooled and this structure causes an output difference between the cylinders 12, it is configured as described in the foregoing to compensate the difference.

As is clear in FIG. 7, when the engine load factor is idling (engine load is zero) or 100 percent (engine load is full), the control circuit 46 controls the throttle openings of the first and second cylinders 12a, 12b to be the same, i.e., 0 percent or 100 percent. In other words, when the load of the engine is other than zero or full, the control circuit 46 controls the throttle openings of the cylinders to be different from each other.

In FIG. 7, it is promised that the throttle opening is 0 percent at the fully-closed position (more precisely almost fully-closed position), 100 percent at the fully-opened position (more precisely position in the vicinity of 90 degrees), and 50 percent at the middle thereof. The throttle opening or engine load factor which is not exemplified in FIG. 7 is calculated by interpolating the values shown in the figure.

Although not shown, the control circuit 46 controls the fuel injection amount based on the controlled throttle opening and engine load factor. Specifically, when the engine load factor is 50 percent, the control circuit 46 controls the fuel injection amount of the first cylinder 12a at a value corresponding to the throttle opening of 100 percent and that of the second cylinder 12b at a value corresponding to the throttle opening of 0 percent.

As stated above, the embodiment is configured to have a system for a system for or method of controlling a general-purpose internal combustion engine (10) having a plurality of cylinders (12a, 12b) each equipped with a throttle valve (72a, 72b) that opens/closes an air intake path and a fuel injector (18a, 18b) that injects fuel into a combustion chamber, and a cooling fan (32) that sucks in and blows air onto the cylinders as cooling air, characterized by: a throttle driver (74a, 74b) that drives an actuator (electric motor 76a, 76b) of the throttle valve (72) of each of the cylinders (12) to open/close; an injector driver (80a, 80b) that drives the fuel injector (18) of each of the cylinders (12) to open; and a controller (control circuit 46) that controls operation of the throttle driver (74) and injector driver (80) in such a way that the throttle opening and an amount of fuel to be injected (fuel injection amount) are different for each of the cylinders, such that an engine speed becomes constant.

With this, when making the throttle opening and the fuel injection amount different for the cylinders 12, it becomes possible to compensate the difference in cooling effect among the cylinders and to obtain output characteristics of the engine 10 as desired.

In the system or method, the cylinders (12) are positioned at different locations in flow of the cooling air, and the controller (46) increases the throttle opening and the amount of fuel to be injected of one of the cylinders (12a) positioned upstream than those of other cylinder (12b) positioned downstream such that the throttle opening and the amount of fuel to be injected are different for each of the cylinders (12).

With this, it becomes possible to compensate the difference in the cooling effect among the cylinders 12 more appropriately and to definitely obtain the output characteristics of the engine 10 as desired.

Further, it becomes possible to move the throttle valve 72a (of the cylinder 12a that is likely to be cooled) to a fully-opened position at any load, while moving the throttle valve 72b (of the cylinder 12b that is less likely to be cooled) to the fully-opened position only at high load (where thermal load increases), thereby enabling improved air routing and circulation to enhance the cooling effect of the engine 10.

Furthermore, since the cylinder 12a (that is more likely to be cooled) will be controlled to a throttle-opened position more often than the cylinder 12b (that is less likely to be cooled), it becomes possible for the engine 10 as a whole to decrease pumping loss and to reduce heat loss as the combustion state becomes stable. In addition, since the cylinder 12a (that is more likely to be cooled) will be controlled to a throttle-opened position more often, it becomes possible to improve control response at a time when load is suddenly imparted.

In the system or method, when a rate of load of the engine (10), i.e., engine load factor and the throttle opening are expressed by percent, the controller (46) controls operation of the throttle driver (74) such that the throttle opening of the cylinders (12) are equal to the rate in percent.

With this, it becomes possible to compensate for the difference in the cooling effect among the cylinders 12 easily, and to obtain output characteristics of the engine 10 as desired.

In the system or method, the controller controls operation of the throttle driver and injector driver such that the throttle opening and the amount of fuel to be injected are different for each of the cylinders, when a load of the engine is other than zero or full.

With this, it becomes possible to definitely ensure idling operation. In addition, it becomes possible to prevent the throttle opening of the cylinders 12 from being unnecessarily made different at the full load.

In the system or method, the engine (10) is an air-cooled general-purpose engine having two cylinders (12a, 12b).

It should be noted that, although the engine 10 having two cylinders, i.e., the first and second cylinders 12a, 12b, is taken as an example in the foregoing, it can be applied to an engine of forced-air-cooled type that is equipped with more than two cylinders which differ in cooling effect from one another.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a general-purpose internal combustion engine having a plurality of cylinders each equipped with a throttle valve that opens or closes an air intake path and a fuel injector that injects fuel into a combustion chamber, and a cooling fan that draws in and blows air onto the cylinders as cooling air, said system comprising:

a throttle driver that drives an actuator of the respective throttle valves of each of the cylinders to open or close;

an injector driver that drives the respective fuel injectors of each of the cylinders to open; and a controller that controls operation of the throttle driver and injector driver in such a way that the throttle opening and an amount of fuel to be injected are different for each of the cylinders such that an engine speed becomes substantially constant, wherein the cylinders are positioned at different locations in the flow of the cooling air, and the controller increases the throttle opening and the amount of fuel to be injected of one of the cylinders positioned upstream, relative to the throttle opening and the amount of fuel to be injected of the other cylinder positioned downstream such that the throttle opening and the amount of fuel to be injected are different for each of the cylinders.

2. The system according to claim 1, wherein when a rate of load of the engine and the throttle opening are expressed by percent, the controller controls operation of the throttle driver such that the throttle openings of the cylinders are equal to the rate of load in percent.

3. The system according to claim 1, wherein the controller controls operation of the throttle driver and injector driver such that the throttle opening and the amount of fuel to be injected are different for each of the cylinders, when a load of the engine is other than zero or full.

4. The system according to claim 1, wherein the engine is an air-cooled general-purpose engine having two cylinders.

5. A method of controlling a general-purpose internal combustion engine having a plurality of cylinders each cylinder equipped with a throttle valve that opens or closes an air intake path and a fuel injector that injects fuel into a combustion chamber, a cooling fan that sucks in and blows air onto the cylinders as cooling air, a throttle driver that drives an actuator of the throttle valve of each of the cylinders to open/close, and an injector driver that drives the fuel injector of each of the cylinders to open, said method comprising the step of:

controlling operation of the throttle driver and injector driver in such a way that the throttle opening and an amount of fuel to be injected are different for each of the cylinders, such that an engine speed becomes substantially constant, wherein the cylinders are positioned at different locations in the flow of the cooling air, and the step of controlling selectively increases the throttle opening and the amount of fuel to be injected into one of the cylinders positioned upstream than those of the other cylinder positioned downstream such that the throttle opening and the amount of fuel to be injected are different for each of the cylinders.

6. The method according to claim 5, wherein when a rate of load of the engine and the throttle opening are expressed by percent, the step of controlling controls operation of the throttle driver such that the throttle openings of the cylinders are equal to the rate of load in percent.

7. The method according to claim 5, wherein the controller controls operation of the throttle driver and injector driver such that the throttle opening and the amount of fuel to be injected are different for each of the cylinders, when a load of the engine is other than zero or full.

8. The method according to claim 5, wherein the engine is an air-cooled general-purpose engine having two cylinders.

* * * * *